(12) United States Patent
Kim (10) Patent No.: US 11,186,323 B2
(45) Date of Patent: Nov. 30, 2021

(54) VEHICLE REAR STRUCTURE WITH REINFORCED BACK FRAME

(71) Applicants: HYUNDAI MOTOR COMPANY, Seoul (KR); KIA MOTORS CORPORATION, Seoul (KR)

(72) Inventor: Hyung Tae Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/005,772

(22) Filed: Aug. 28, 2020

(65) Prior Publication Data

US 2021/0171117 A1 Jun. 10, 2021

(30) Foreign Application Priority Data

Dec. 10, 2019 (KR) ........................ 10-2019-0164176

(51) Int. Cl.
*B62D 27/02* (2006.01)
*B62D 25/06* (2006.01)
*B62D 25/04* (2006.01)
*B62D 25/02* (2006.01)

(52) U.S. Cl.
CPC ........... *B62D 27/023* (2013.01); *B62D 25/02* (2013.01); *B62D 25/06* (2013.01); *B62D 25/04* (2013.01)

(58) Field of Classification Search
CPC ........ B62D 25/06; B62D 25/02; B62D 25/04; B62D 27/023
USPC ............. 296/203.01, 203.04, 193.08, 29, 30, 296/146.8, 146.9
See application file for complete search history.

(56) References Cited

FOREIGN PATENT DOCUMENTS

| DE | 102016001241 A1 | * | 8/2017 | ............. B62D 23/00 |
|----|---|---|---|---|
| JP | H08230482 A | * | 9/1996 | |
| JP | H09263265 A | * | 10/1997 | |
| JP | 2019111878 A | * | 7/2019 | ............. B60J 5/101 |
| WO | WO-2015122400 A1 | * | 8/2015 | ............. B62D 25/04 |
| WO | WO-2015190034 A1 | * | 12/2015 | ........... B62D 25/087 |

* cited by examiner

*Primary Examiner* — Dennis H Pedder
(74) *Attorney, Agent, or Firm* — Morgan, Lewis & Bockius LLP (57) ABSTRACT

A vehicle rear structure includes: a back frame defining a back opening; and a corner reinforcing structure mounted on an upper corner of the back frame. The back frame is defined by a rear edge of a roof panel and rear edges of a pair of side structures. The corner reinforcing structure includes a first reinforcing member connected to each side structure, a second reinforcing member connected to the rear edge of the roof panel, a third reinforcing member connected to the first reinforcing member, and a structural member connecting the first reinforcing member and the second reinforcing member.

10 Claims, 10 Drawing Sheets

VEHICLE REAR STRUCTURE WITH REINFORCED BACK FRAME

CROSS-REFERENCE TO RELATED APPLICATION

This application is based on and claims the benefit of priority to Korean Patent Application No. 10-2019-0164176, filed on Dec. 10, 2019, in the Korean Intellectual Property Office, the disclosure of which is incorporated herein in its entirety by reference.

TECHNICAL FIELD

The present disclosure relates to a vehicle rear structure, and more particularly, to a vehicle rear structure capable of improving torsional stiffness with respect to an upper corner of a back frame defining a back opening of a vehicle.

BACKGROUND

As well known in the art, a vehicle has a back opening, and the back opening communicates with a luggage compartment or rear compartment in which luggage and the like are received. A back door, such as a hatch back door, a trunk lid, a tailgate, or a lift gate, may be installed in the back opening in a manner that opens and closes the back opening.

A vehicle body includes a back frame part defining a back opening, and the back frame part may be defined by a rear edge of a roof panel, rear edges of a pair of side structures, and a top edge of a back panel. Each side structure includes a side outer panel and a quarter inner panel mounted on the rear of the side outer panel. The rear of the side outer panel and the quarter inner panel may define a rear pillar (C-pillar and/or D-pillar).

An upper end of the rear pillar is adjacent to an upper corner of the back frame part, and the upper end of the rear pillar and the upper corner of the back frame part are relatively sensitive to torsional stiffness of the vehicle body. In particular, when the upper end of the rear pillar and/or the upper corner of the back frame part, at which the occurrence of torsional deformation is relatively high during the driving of the vehicle, has relatively low stiffness, durability of the roof may be reduced. To solve this problem, a structural foam member which is relatively expensive may be additionally mounted on the upper end of the back frame part (for example, the rear edge of the roof), resulting in increased manufacturing cost.

The stiffness of the vehicle body is essential to improving the vehicle driving performance such as ride & handling (R&H), noise, vibration, and harshness (NVH), and durability, and thus it is necessary to improve the stiffness of the vehicle body. To improve the stiffness of the vehicle body, it is necessary to increase torsional stiffness with respect to the upper end of the rear pillar and the upper corner of the back frame part.

The upper end of the rear pillar may be connected to the roof panel through a plurality of joint members. The plurality of joint members may be connected to intersect along the longitudinal direction, transverse direction, and height direction of the vehicle.

According to the related art, connection stiffness between the plurality of joint members is relatively low, resulting in a failure to increase the stiffness of the upper corner of the back frame part. For example, the plurality of joint members are restrained in the longitudinal direction of the vehicle, but are not restrained in the transverse direction or height direction of the vehicle, and thus it is difficult to substantially improve the stiffness of the upper end of the rear pillar and/or the upper corner of the back frame part, thereby reducing the torsional stiffness of the back frame part.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle rear structure capable of improving torsional stiffness with respect to an upper corner of a back frame defining a back opening of a vehicle.

According to an aspect of the present disclosure, a vehicle rear structure may include: a back frame defining a back opening; and a corner reinforcing structure mounted on an upper corner of the back frame, wherein the back frame may be defined by a rear edge of a roof panel and rear edges of a pair of side structures, and the corner reinforcing structure may include a first reinforcing member connected to each side structure, a second reinforcing member connected to the rear edge of the roof panel, a third reinforcing member connected to the first reinforcing member, and a structural member connecting the first reinforcing member and the second reinforcing member.

The first reinforcing member may include a first restraining wall extending along a plane orthogonal to a longitudinal direction of a vehicle.

The structural member may include a second restraining wall extending along the plane orthogonal to the longitudinal direction of the vehicle, and the first restraining wall and the second restraining wall may be spaced apart from each other in the longitudinal direction of the vehicle.

The second reinforcing member may include a first contact wall contacting the first restraining wall, and the first contact wall may extend along the plane orthogonal to the longitudinal direction of the vehicle.

The first reinforcing member may include a third restraining wall and a fourth restraining wall extending along a plane orthogonal to a transverse direction of a vehicle, and the third restraining wall and the fourth restraining wall may be spaced apart from each other.

The third reinforcing member may include a third contact wall contacting the third restraining wall, and the third contact wall may extend along the plane orthogonal to the transverse direction of the vehicle.

The roof panel may include a vertical flange extending vertically from the rear edge thereof and a horizontal flange extending horizontally from a bottom end of the vertical flange.

The side structure may include a side outer panel, a quarter inner panel disposed inward of a quarter area of the side outer panel, and a rear extension connected to a rear edge of the side outer panel.

The vertical flange and the horizontal flange may be joined to an upper end of the rear extension, the upper end of the rear extension may be joined to the first contact wall, and the first contact wall may be joined to the first restraining wall of the first reinforcing member.

The structural member may include a first channel in which at least a portion of the first reinforcing member is received, and a second channel in which at least a portion of the second reinforcing member is received, and the first channel and the second channel may intersect each other to match the upper corner of the back frame.

The first reinforcing member may include a front extension portion extending toward the front of the vehicle, and a rear extension portion extending toward the rear of the vehicle.

The front extension portion and the side structure may be joined, and the rear extension portion and the first channel may be joined.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
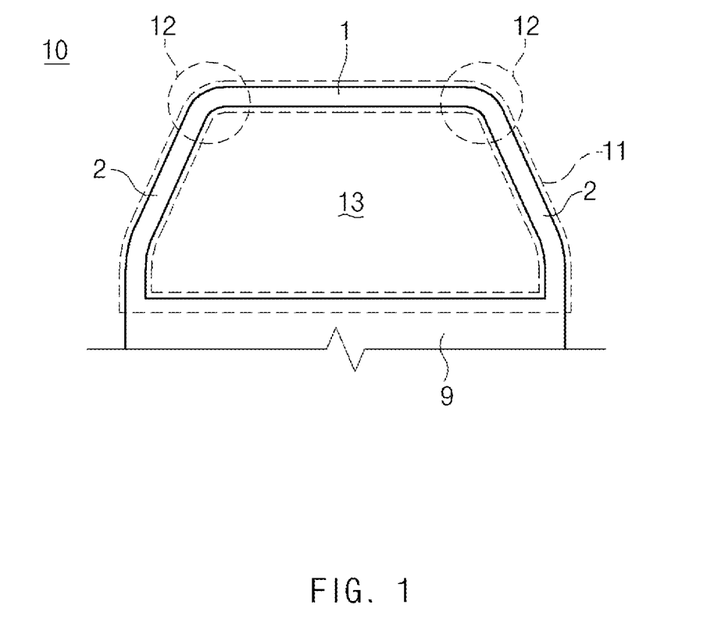
FIG. 1 illustrates a rear view of a back opening and a back frame of a vehicle rear structure according to an exemplary embodiment of the present disclosure.

Referring to FIG. 1, a vehicle rear structure 10 according to an exemplary embodiment of the present disclosure may include a back frame 11 defining a back opening 13. The back frame 11 may be defined by a roof panel 1 covering a top of a vehicle body, a pair of side structures 2 located on both sides of the roof panel 1, and a back panel 9 located on a rear bottom of the vehicle body. In particular, the back frame 11 may be defined by a rear edge of the roof panel 1, rear edges of the pair of side structures 2, and a top edge of the back panel 9. The back opening 13 may communicate with a luggage compartment or rear compartment in which luggage and the like are received, and a back door such as a hatch back door, a trunk lid, a tailgate, or a lift gate may be installed in the back opening 13 in a manner that opens and closes the back opening 13. The back frame 11 may have a pair of upper corners 12.

Figure 2:
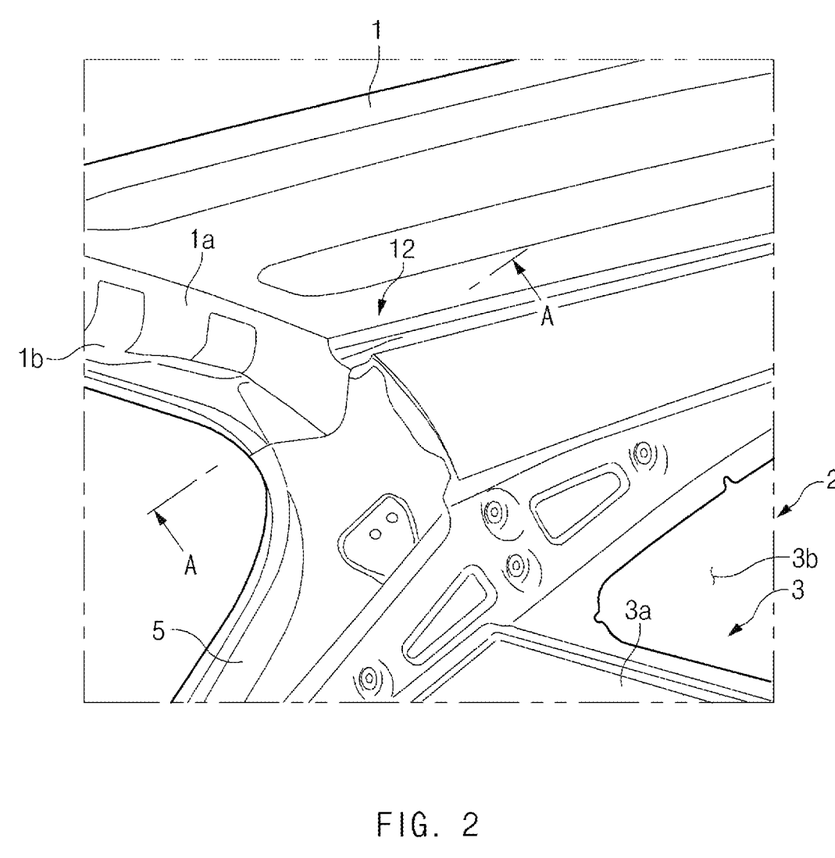
FIG. 2 illustrates a perspective view of an upper corner of a back frame in a vehicle rear structure according to an exemplary embodiment of the present disclosure.

Referring to FIG. 2, the roof panel 1 may have a vertical flange 1a extending vertically from the rear edge thereof and a horizontal flange 1b extending horizontally from a bottom end of the vertical flange 1a.

Figure 3:
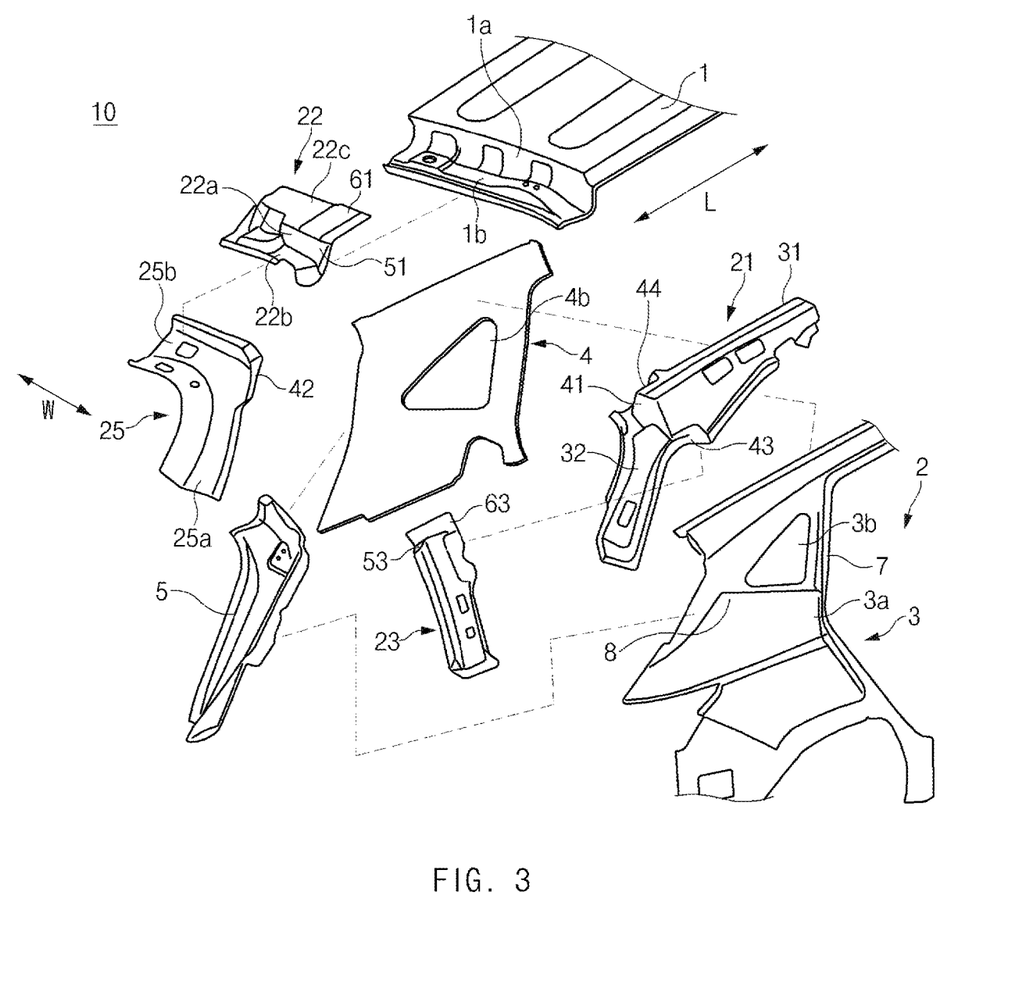
FIG. 3 illustrates an exploded perspective view of a plurality of components constituting a back frame in a vehicle rear structure according to an exemplary embodiment of the present disclosure.

Referring to FIG. 3, each side structure 2 may include a side outer panel 3, a quarter inner panel 4 disposed inward of a quarter area 3a of the side outer panel 3, and a rear extension 5 connected to a rear edge of the side outer panel 3.

The rear extension 5 may be connected to the rear edge of the side outer panel 3, and the rear extension 5 may be changed into various shapes depending on vehicle models. The quarter area 3a of the side outer panel 3 may have an opening 3b in which quarter glass is mounted, and the quarter inner panel 4 may have an opening 4b corresponding to the opening 3b of the side outer panel 3. The side outer panel 3 and the quarter inner panel 4 may be shaped to define one or more rear pillars 7 and 8. According to the exemplary embodiment of FIG. 3, one or more rear pillars 7 and 8 may be a C-pillar 7 and a D-pillar 8.

Referring to FIG. 2, the upper corner 12 may be defined by the roof panel 1 and the rear extension 5 mounted on the rear edge of the side outer panel 3.

Figure 5:
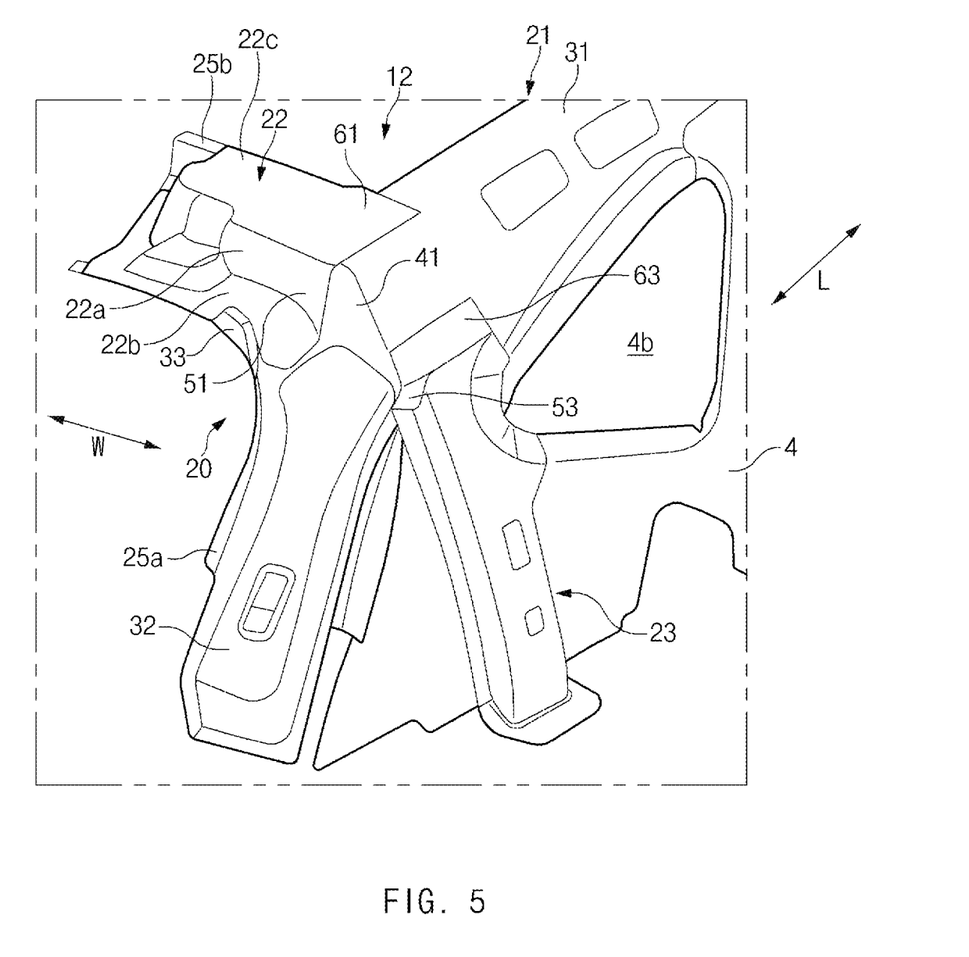
FIG. 5 illustrates a perspective view of a corner reinforcing structure of a back frame connected to a quarter inner panel in a vehicle rear structure according to an exemplary embodiment of the present disclosure.

Referring to FIG. 5, the vehicle rear structure according to an exemplary embodiment of the present disclosure may include a corner reinforcing structure 20 which increases stiffness with respect to the upper corner 12 of the back frame 11, and the corner reinforcing structure 20 may be disposed inward of the upper corner 12 of the back frame 11. For example, the corner reinforcing structure 20 may be disposed in a portion of the back frame 11 in which the roof panel 1 and the rear extension 5 of the side structure 2 are connected, thereby improving the stiffness of the upper corner 12 of the back frame 11.

FIG. 5 illustrates the corner reinforcing structure 20 which is disposed inward of the upper corner 12 in a state in which the roof panel 1, the side outer panel 3, and the rear extension 5 in FIG. 2 are removed.

According to an exemplary embodiment, the corner reinforcing structure 20 may include a plurality of reinforcing members 21, 22, and 23 connected in a longitudinal direction of the vehicle and a transverse direction of the vehicle.

The plurality of reinforcing members 21, 22, and 23 may restrain the roof panel 1, the side structure 2, and the rear extension 5, which constitute the upper corner 12 of the back frame 11, with respect to the longitudinal direction and transverse direction of the vehicle, thereby preventing the movement or deformation of the roof panel 1, the side structure 2, and the rear extension 5 in the longitudinal direction and transverse direction of the vehicle.

In addition, the plurality of reinforcing members 21, 22, and 23 may be restrained in the longitudinal direction L of the vehicle and the transverse direction of the vehicle by a plurality of restraining walls 41 and 42 orthogonal to the longitudinal direction L of the vehicle and a plurality of restraining walls 43 and 44 orthogonal to the transverse direction of the vehicle, thereby increasing the stiffness of the upper corner 12 of the back frame 11.

Referring to FIGS. 3 and 5, the corner reinforcing structure 20 may include a first reinforcing member 21 connected to the side structure 2, a second reinforcing member 22 mounted on the rear edge of the roof panel 1, a third reinforcing member 23 connected to the first reinforcing member 21, and a structural member 25 connecting the first reinforcing member 21 and the second reinforcing member 22.

The first reinforcing member 21 may include a front extension portion 31 extending toward the front of the vehicle, and a rear extension portion 32 extending toward the rear of the vehicle.

The front extension portion 31 may be connected to the side structure 2. In particular, the front extension portion 31 may be connected between the quarter inner panel 4 and the quarter area 3a of the side outer panel 3. Specifically, a bottom surface of the front extension portion 31 and the quarter inner panel 4 may be joined by welding and/or the like, and a top surface of the front extension portion 31 and the quarter area 3a of the side outer panel 3 may be joined by welding and/or the like. In particular, the front extension portion 31 may be disposed to increase stiffness with respect to the C-pillar 7 and the D-pillar 8 of the side structure 2. The front extension portion 31 may have a cavity which is open to an interior space of the vehicle. The rear extension portion 32 may extend in a longitudinal direction of the rear extension 5, and a bottom surface of the rear extension 5 and the rear extension portion 32 may be joined by welding, using fasteners, and/or the like so that stiffness of the rear extension 5 may be improved. The rear extension portion 32 may have a cavity which is open to the interior space of the vehicle.

Referring to FIGS. 3, 5, 6, and 7, the first reinforcing member 21 may include a first restraining wall 41 extending along a plane orthogonal to the longitudinal direction L of the vehicle. The first restraining wall 41 may be located at a rear end of the front extension portion 31, so that the first restraining wall 41 may close a rear end of the cavity of the front extension portion 31. The first restraining wall 41 may restrain the plurality of components constituting the upper corner 12 of the back frame 11 with respect to the longitudinal direction L of the vehicle, thereby significantly improving stiffness, durability, etc. with respect to the upper corner 12 of the back frame 11.

Figure 8:
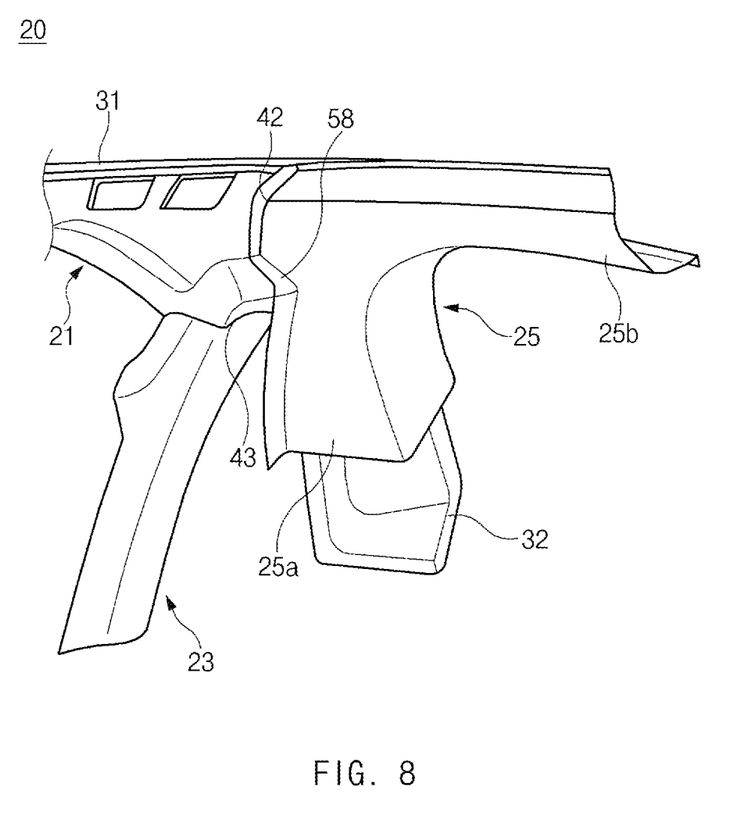
FIG. 8 illustrates a perspective view of the inside of the corner reinforcing structure in FIG. 7.

Referring to FIG. 8, the structural member 25 may include a second restraining wall 42 extending along the plane orthogonal to the longitudinal direction L of the vehicle. As the structural member 25 is connected to the first reinforcing member 21, the second restraining wall 42 of the structural member 25 may face the first restraining wall 41 and be spaced apart from the first restraining wall 41. For example, the second restraining wall 42 may be spaced apart from the first restraining wall 41 in the longitudinal direction L of the vehicle. The second restraining wall 42 may restrain the plurality of components constituting the upper corner 12 of the back frame 11 with respect to the longitudinal direction L of the vehicle, thereby significantly improving stiffness, durability, etc. with respect to the upper corner 12 of the back frame 11.

That is, the first reinforcing member 21 may have the first restraining wall 41 orthogonal to the longitudinal direction L of the vehicle, and the structural member 25 may have the second restraining wall 42 orthogonal to the longitudinal direction L of the vehicle so that they may restrain the plurality of components constituting the upper corner 12 of the back frame 11 with respect to the longitudinal direction L of the vehicle, thereby significantly improving the stiffness, durability, etc. of the upper corner 12 of the back frame 11.

Referring to FIGS. 3, 5, 6, and 9, the first reinforcing member 21 may include a third restraining wall 43 extending along a plane orthogonal to the transverse direction of the vehicle. The third restraining wall 43 may restrain the plurality of components constituting the upper corner 12 of the back frame 11 with respect to the transverse direction of the vehicle, thereby significantly improving stiffness, durability, etc. with respect to the upper corner 12 of the back frame 11.

Figure 9:
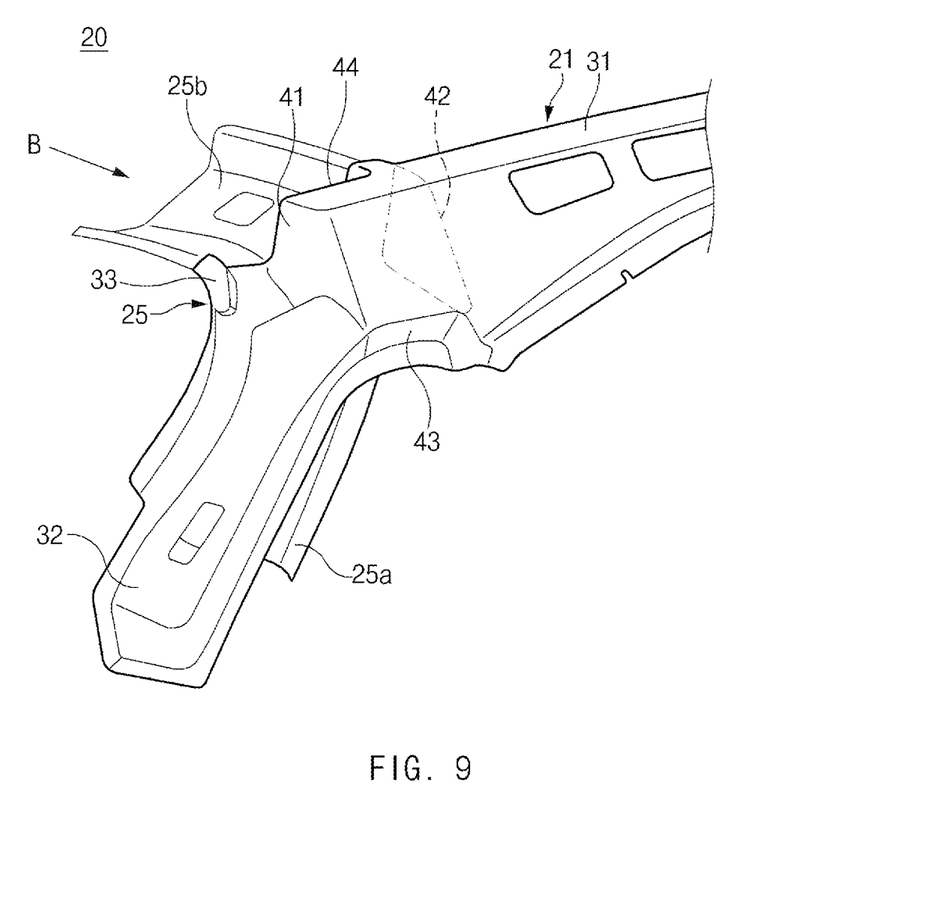
FIG. 9 illustrates a perspective view of the corner reinforcing structure in FIG. 7 from which the second reinforcing member is removed.
Figure 10:
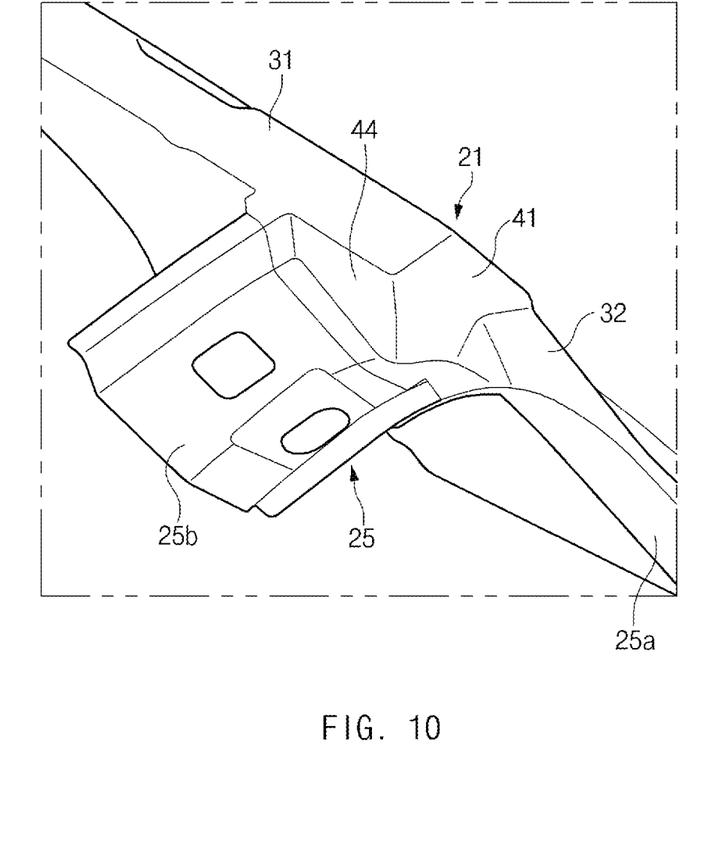
FIG. 10 illustrates a perspective view which is viewed from a direction indicated by arrow B of FIG. 9.

Referring to FIGS. 3, 9 and 10, the first reinforcing member 21 may include a fourth restraining wall 44 extending along the plane orthogonal to the transverse direction of the vehicle. The fourth restraining wall 44 may face the third restraining wall 43 and be spaced apart from the third restraining wall 43. For example, the fourth restraining wall 44 may be spaced apart from the third restraining wall 43 in the transverse direction of the vehicle. The fourth restraining wall 44 may restrain the plurality of components constituting the upper corner 12 of the back frame 11 with respect to the transverse direction of the vehicle, thereby significantly improving stiffness, durability, etc. with respect to the upper corner 12 of the back frame 11.

That is, the first reinforcing member 21 may have the two restraining walls 43 and 44 orthogonal to the transverse direction of the vehicle so that they may restrain the plurality of components constituting the upper corner 12 of the back frame 11 with respect to the transverse direction of the vehicle, thereby significantly improving the stiffness, durability, etc. of the upper corner 12 of the back frame 11.

The first restraining wall 41, the second restraining wall 42, the third restraining wall 43, and the fourth restraining wall 44 may be located in a portion where the front extension portion 31 and the rear extension portion 32 meet.

Figure 6:
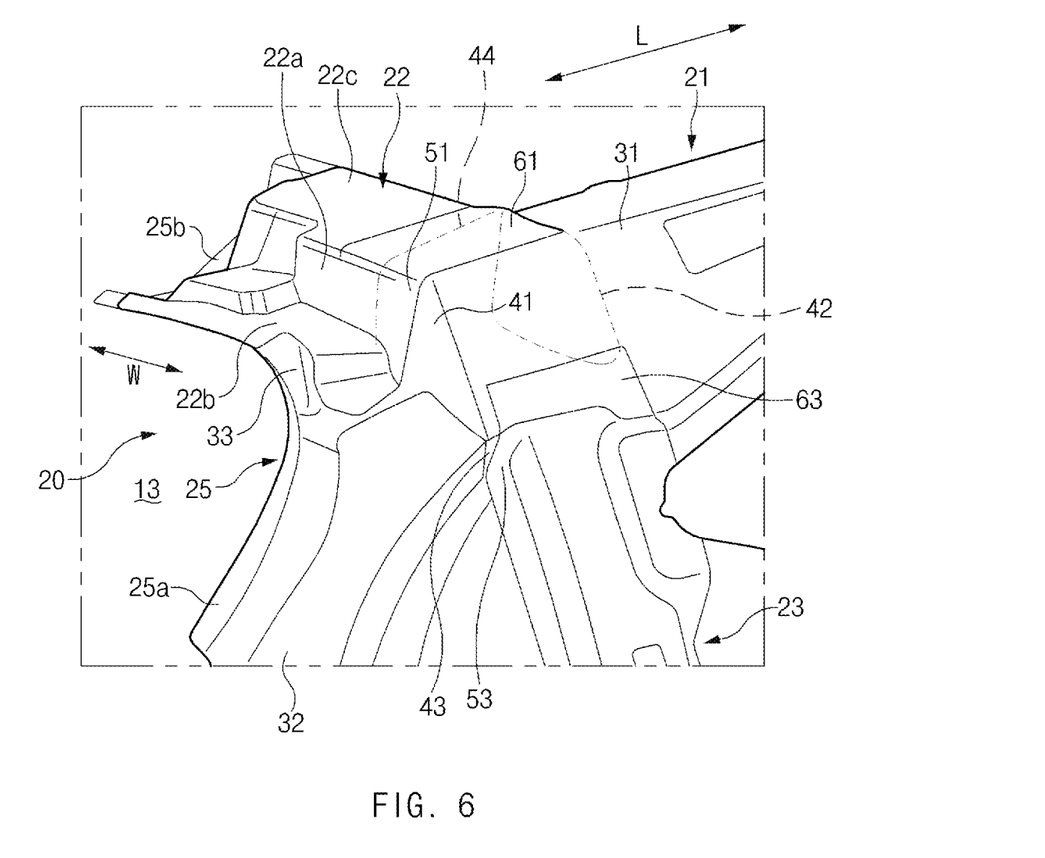
FIG. 6 illustrates an enlarged view of a portion in which a first reinforcing member, a second reinforcing member, and a third reinforcing member in FIG. 5 are connected.

Referring to FIGS. 3, 5, and 6, the second reinforcing member 22 may include a vertical wall 22a corresponding to the vertical flange 1a of the roof panel 1, a horizontal wall 22b corresponding to the horizontal flange 1b of the roof panel 1, and a cover wall 22c extending horizontally from a top end of the vertical wall 22a. The vertical wall 22a and the vertical flange 1a of the roof panel 1 may be joined by welding and/or the like, and the horizontal wall 22b and the horizontal flange 1b of the roof panel 1 may be joined by welding and/or the like. The cover wall 22c and the rear edge of the roof panel 1 may be joined by welding and/or the like.

The second reinforcing member 22 may include a first contact wall 51 contacting the first restraining wall 41 of the first reinforcing member 21, and a flange 61 extending horizontally from the first contact wall 51.

The first contact wall 51 may extend along the plane orthogonal to the longitudinal direction L of the vehicle. The first contact wall 51 may have a shape corresponding to that of the first restraining wall 41. The first contact wall 51 and the first restraining wall 41 may be joined by welding and/or the like. The first contact wall 51 of the second reinforcing member 22 and the first restraining wall 41 of the first reinforcing member 21 may be joined by welding and/or the like, thereby more firmly restraining the plurality of components constituting the upper corner 12 of the back frame 11 with respect to the longitudinal direction L of the vehicle.

The flange 61 may be joined to a partial surface of the first reinforcing member 21 by welding and/or the like. The flange 61 may extend along a plane orthogonal to a height direction of the vehicle.

Figure 7:
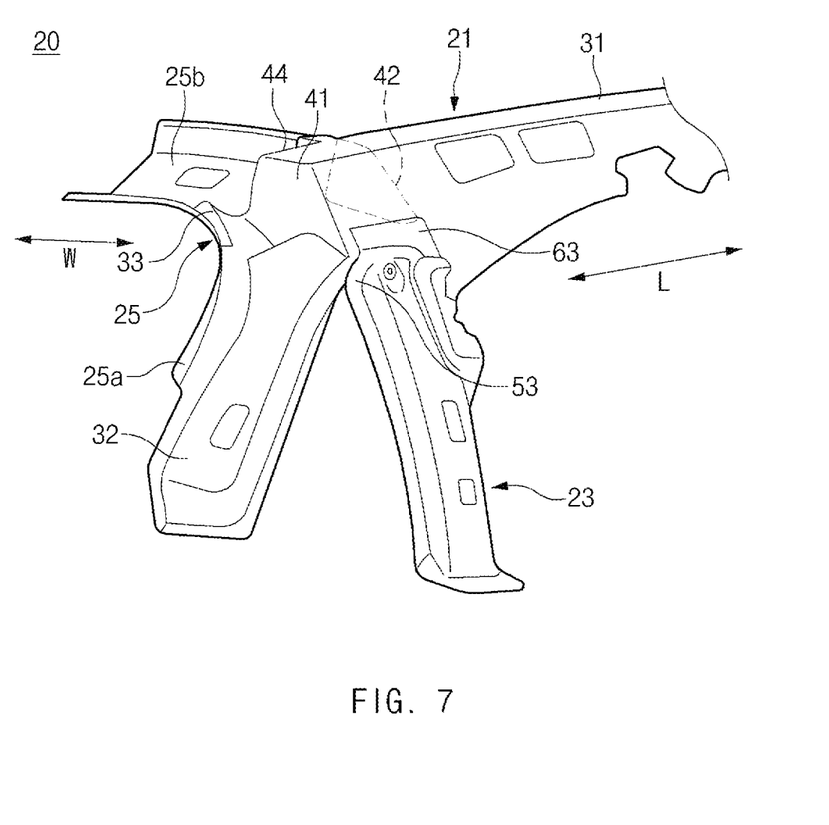
FIG. 7 illustrates a perspective view of the corner reinforcing structure in FIG. 5 from which the quarter inner panel is removed.

Referring to FIGS. 7 and 9, the first reinforcing member 21 may have a stopper 33 protruding upwardly from a top end of the rear extension portion 32. Referring to FIGS. 5 and 6, the stopper 33 may restrict the position of the second reinforcing member 22. In particular, the position of the horizontal wall 22b of the second reinforcing member 22 may be restricted by the stopper 33, and thus the first contact wall 51 and the flange 61 of the second reinforcing member 22 may be accurately positioned with respect to the first reinforcing member 21.

The third reinforcing member 23 may include a third contact wall 53 contacting the third restraining wall 43 of the first reinforcing member 21, and a flange 63 extending from the third contact wall 53. The third contact wall 53 may contact an outboard side surface of the third restraining wall 43, and the outboard side surface of the third restraining wall 43 may face an exterior space of the vehicle. The third reinforcing member 23 and the quarter area 3a of the side outer panel 3 may be joined by welding and/or the like, and thus stiffness of the D-pillar of the side outer panel 3 may be improved.

The third contact wall 53 may extend along the plane orthogonal to the transverse direction of the vehicle. In particular, the third contact wall 53 may have a shape corresponding to that of at least a portion of the third restraining wall 43. The third contact wall 53 and the third restraining wall 43 may be joined by welding and/or the like. The third contact wall 53 of the third reinforcing member 23 and the third restraining wall 43 of the first reinforcing member 21 may be joined by welding and/or the like, thereby more firmly restraining the plurality of components constituting the upper corner 12 of the back frame 11 with respect to the transverse direction of the vehicle.

The flange 63 may extend to overlap the top surface of the first reinforcing member 21 with a certain area therebetween. The flange 63 and the top surface of the first reinforcing member 21 may be joined by welding, using fasteners, and the like.

Referring to FIGS. 3, 5, and 6, the structural member 25 may have a first channel 25a in which the rear extension portion 32 of the first reinforcing member 21 is received, and a second channel 25b in which the second reinforcing member 22 is received.

The first channel 25a and the second channel 25b may intersect each other to match the upper corner 12 of the back frame 11. The rear extension portion 32 of the first reinforcing member 21 and the first channel 25a may be joined by welding and/or the like. The second reinforcing member 22 and the second channel 25b may be joined by welding and/or the like. By joining the rear extension portion 32 of the first reinforcing member 21 to the first channel 25a of the structural member 25 through welding and/or the like, and joining the second reinforcing member 22 to the second channel 25b of the structural member 25 through welding and/or the like, the structural member 25 may connect the first reinforcing member 21 and the second reinforcing member 22.

Referring to FIG. 8, the structural member 25 may include an engagement shoulder 58 joined to an inboard side surface of the third restraining wall 43 of the first reinforcing member 21, and the engagement shoulder 58 may face the third contact wall 53. The inboard side surface of the third restraining wall 43 may face the interior space of the vehicle. The engagement shoulder 58 may be located below the second restraining wall 42, and the engagement shoulder 58 and the inboard side surface of the third restraining wall 43 may be joined by welding and/or the like, and thus the second restraining wall 42 of the structural member 25 may be located within the cavity of the front extension portion 31 of the first reinforcing member 21. By joining the engagement shoulder 58 of the structural member 25 to the inboard side surface of the third restraining wall 43 of the first reinforcing member 21, the second restraining wall 42 may be firmly disposed within the cavity of the front extension portion 31 of the first reinforcing member 21, and the second restraining wall 42 may more firmly restrain the plurality of components constituting the upper corner 12 of the back frame 11 with respect to the longitudinal direction L of the vehicle.

Figure 4:
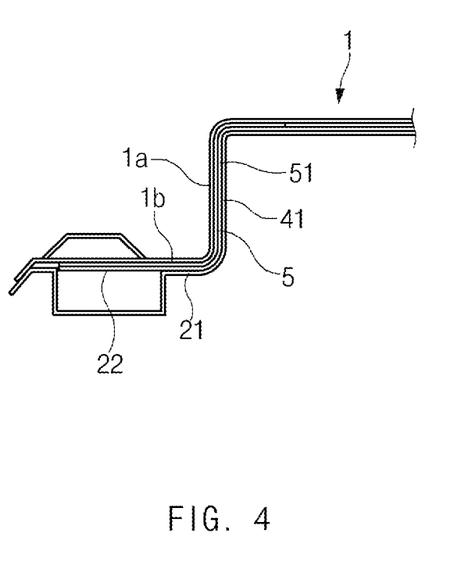
FIG. 4 illustrates a cross-sectional view taken along line A-A of FIG. 2.

Referring to FIGS. 2 and 4, the vertical flange 1a and the horizontal flange 1b of the roof panel 1 may be overlapped and joined to an upper end of the rear extension 5, and the upper end of the rear extension 5 may be overlapped and joined to the first contact wall 51 of the second reinforcing member 22. The first contact wall 51 of the second reinforcing member 22 may be joined to the first restraining wall 41 of the first reinforcing member 21. The vertical flange 1a and the horizontal flange 1b of the roof panel 1 may be directly joined to the rear extension 5, and the vertical flange 1a and the horizontal flange 1b of the roof panel 1 may be restrained with respect to the longitudinal direction L of the vehicle by the first restraining wall 41 of the first reinforcing member 21 through the rear extension 5 and the second reinforcing member 22, and thus durability and connection stiffness of the roof panel 1, the rear extension 5, and the side structure 2 may be improved.

Referring to FIG. 5, the front extension portion 31 of the first reinforcing member 21 may be located above the opening 4b of the quarter inner panel 4, and accordingly the corner reinforcing structure 20 may be connected to the quarter inner panel 4, the rear extension 5 may be joined to the rear extension portion 32 of the first reinforcing member 21, the roof panel 1 may be joined to the second reinforcing member 22, and the side outer panel 3 may be joined to the third reinforcing member 23.

As set forth above, according to exemplary embodiments of the present disclosure, by not only firmly forming the connection structure between the plurality of components constituting the back frame, but also restraining the plurality of components with respect to the longitudinal direction and transverse direction of the vehicle by the plurality of reinforcing members and structural members, the stiffness, durability, etc. of the upper corner of the back frame defining the back opening may be improved, and thus the vehicle driving performance such as ride & handling (R&H) and noise, vibration, and harshness (NVH) may be improved.

In particular, according to exemplary embodiments of the present disclosure, by significantly reducing the constituent components of the corner reinforcing structure that increase the stiffness of the upper corner of the back frame, cost reduction and weight reduction may be achieved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle rear structure, comprising:
a back frame defining a back opening; and
a corner reinforcing structure mounted on an upper corner of the back frame,
wherein the back frame is defined by a rear edge of a roof panel and rear edges of a pair of side structures, and
wherein the corner reinforcing structure includes:
a first reinforcing member connected to each side structure;
a second reinforcing member connected to the rear edge of the roof panel;
a third reinforcing member connected to the first reinforcing member; and
a structural member connecting the first reinforcing member and the second reinforcing member.

2. The vehicle rear structure according to claim 1, wherein the first reinforcing member includes a first restraining wall extending along a plane orthogonal to a longitudinal direction of a vehicle.

3. The vehicle rear structure according to claim 2, wherein the structural member includes a second restraining wall extending along the plane orthogonal to the longitudinal direction of the vehicle, and
the first restraining wall and the second restraining wall are spaced apart from each other in the longitudinal direction of the vehicle.

4. The vehicle rear structure according to claim 3, wherein the second reinforcing member includes a first contact wall contacting the first restraining wall, and
the first contact wall extends along the plane orthogonal to the longitudinal direction of the vehicle.

5. The vehicle rear structure according to claim 1, wherein the first reinforcing member includes a third restraining wall and a fourth restraining wall extending along a plane orthogonal to a transverse direction of a vehicle, and
the third restraining wall and the fourth restraining wall are spaced apart from each other.

6. The vehicle rear structure according to claim 5, wherein the third reinforcing member includes a third contact wall contacting the third restraining wall, and
the third contact wall extends along the plane orthogonal to the transverse direction of the vehicle.

7. The vehicle rear structure according to claim 4, wherein the roof panel includes a vertical flange extending vertically from the rear edge thereof and a horizontal flange extending horizontally from a bottom end of the vertical flange,
the side structure includes a side outer panel, a quarter inner panel disposed inward of a quarter area of the side outer panel, and a rear extension connected to a rear edge of the side outer panel,
the vertical flange and the horizontal flange are joined to an upper end of the rear extension,
the upper end of the rear extension is joined to the first contact wall, and
the first contact wall is joined to the first restraining wall of the first reinforcing member.

8. The vehicle rear structure according to claim 1, wherein the structural member includes a first channel in which at least a portion of the first reinforcing member is received, and a second channel in which at least a portion of the second reinforcing member is received, and
the first channel and the second channel intersect each other to match the upper corner of the back frame.

9. The vehicle rear structure according to claim 8, wherein the first reinforcing member includes a front extension portion extending toward a front side of a vehicle, and a rear extension portion extending toward a rear side of the vehicle.

10. The vehicle rear structure according to claim 9, wherein the front extension portion and the side structure are joined, and
the rear extension portion and the first channel are joined.

\* \* \* \* \*